United States Patent [19]

Hasegawa et al.

[11] Patent Number: 5,027,131

[45] Date of Patent: Jun. 25, 1991

[54] RECORDING MEDIUM INCLUDING AN INK-RETAINING LAYER AND AN INK-TRANSPORTING LAYER OF SPECIFIC SIZED PARTICLES AND PROCESS EMPLOYING SAME

[75] Inventors: Kenji Hasegawa, Isehara; Takahiro Mori, Ayase; Masahiko Higuma, Sagamihara, all of Japan

[73] Assignee: Canon Kabushiki Kaisha, Tokyo, Japan

[21] Appl. No.: 519,309

[22] Filed: May 8, 1990

Related U.S. Application Data

[63] Continuation of Ser. No. 174,856, Mar. 29, 1988, abandoned.

[30] Foreign Application Priority Data

Mar. 30, 1987 [JP] Japan .................................. 62-74235

[51] Int. Cl.$^5$ .................................. G01D 15/34

[52] U.S. Cl. .................................. 346/1.1; 346/135.1; 428/327

[58] Field of Search .................. 346/1.1, 140, 135.1; 428/327, 206

[56] References Cited

U.S. PATENT DOCUMENTS

| | | | |
|---|---|---|---|
| 4,460,637 | 7/1984 | Miyamoto | 346/135.1 X |
| 4,785,313 | 11/1988 | Higuma | 346/135.1 X |

FOREIGN PATENT DOCUMENTS

| | | |
|---|---|---|
| 0049040 | 4/1982 | European Pat. Off. . |
| 0083552 | 7/1983 | European Pat. Off. . |
| 0227245 | 7/1987 | European Pat. Off. . |
| 2162442A | 2/1986 | United Kingdom . |

OTHER PUBLICATIONS

Patent Abstracts of Japan, vol. 9, No. 98 (M-375)[1821], 27th Apr. 1985, & JP-A-59 222 381 (Mitsubishi Seishi K.K.), 14-12-1984.

Patent Abstracts of Japan, vol. 10, No. 249 (M-511)[2305], 27th Aug. 1986, & JP-A-61 78 687 (Fujimori Kogyo K.K.), 22-4-1986.

*Primary Examiner*—Joseph W. Hartary

*Attorney, Agent, or Firm*—Fitzpatrick, Cella, Harper & Scinto

[57] ABSTRACT

A recording medium is provided which includes an ink-transporting layer and an ink-retaining layer, the ink-transporting layer being chiefly comprised of particles and a binder, wherein $d \geqq 0.1$ μm when an average value of primary particle diameter of the particles is assumed as d, and the volume of the particles whose particle diameter (x) is included in the range of $d/2 \leqq x \leqq 2d$ is in a proportion of 90% or more of the whole particles. The purpose of this particle and binder arrangement is to provide a recording medium having high gloss and image density, and one particularly having a greatly superior ink absorbing ability and capable of giving recorded images of high image quality that are free from feathering and having high recording density. An ink jet recording process employing the above-mentioned recording medium is also provided.

37 Claims, 1 Drawing Sheet

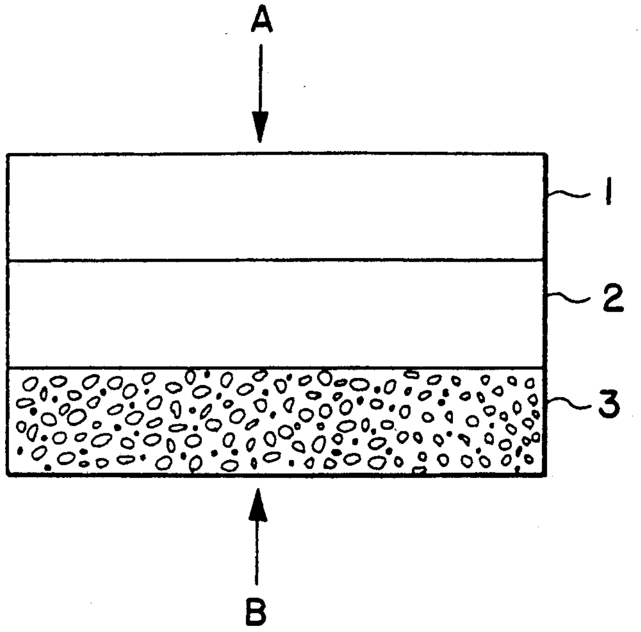
A
1
2
3
B

RECORDING MEDIUM INCLUDING AN INK-RETAINING LAYER AND AN INK-TRANSPORTING LAYER OF SPECIFIC SIZED PARTICLES AND PROCESS EMPLOYING SAME

This application is a continuation of application Ser. No. 174,856 filed Mar. 29, 1988, which is now abandoned.

BACKGROUND OF THE INVENTION

Field of the Invention

The present invention relates to a recording medium suitably usable in ink-jet systems, whose ink-applying surface and image-viewing surface are in an obverse and reverse relationship, and which can give recorded images superior in gloss and storage stability without effecting a post-treatment such as laminating, and, more particularly, to a recording medium that can be greatly superior in the ink absorbing ability, can be perfectly free from any feathering, and can give recorded images of high image quality, having superior definition and high recording density.

RELATED BACKGROUND ART

Previously used as recording mediums suited for ink-jet recording systems, particularly for full color recording, are ink-jet paper comprising a porous layer formed by coating pigments such as silica on a paper surface and, ink-jet OHP (overhead projector) films comprising a plastic film surface coated with resins capable of absorbing inks by dissolution or swell.

The above ink-jet paper, in which the absorption of inks is effected by its porous layer, can quickly absorb inks and is therefore suited for making multicolored images and for high speed printing, advantageously. On the other hand, however, since images are also viewed from the same porous layer side as the printing surface, recording agents are forced to remain as much as possible on the surface of the absorbing layer, thus having the disadvantages that it is inferior in durability such as water resistance of images and abrasion resistance, and storage stability, and the disadvantage such that there cannot be obtained glossy recorded images.

Glossy images can be obtained in the recording mediums of the type where inks are absorbed by dissolution or swell of resins like the ink-jet OHP films, but inks are so slowly absorbed and fixed that there are also problems such that staining or feathering due to the transfer of images, and also image density non-uniformity called beading caused by irregular migration of inks tends to occur when the high speed printing or multicolor printing is carried out, to make it difficult to obtain sharp and beautiful images.

On the other hand, Japanese Patent Laid-open Publications such as No. 136480/1983, and No. 136481/1983, No. 197285/1986, contain disclosures relating to ink-jet recording mediums of the type that a porous ink-absorptive layer is provided on a transparent support, the recording is performed from the porous ink-absorbing layer side according to the ink-jet system, and images are viewed from the transparent support side.

The recording mediums of this type are advantageous as the various performances such as water resistance and abrasion resistance have been sufficiently settled, and yet inks can quickly be absorbed, highly glossy images can be obtained, and beading can be prevented from occurring. However, when printing is performed on the recording mediums of this type according to the ink-jet system, there has been a disadvantage that even though the image-viewing surface is the transparent support side, actually the image density at the viewing surface side results in a density lower than the image density at the printing surface side.

To settle this problem, the present inventors have previously found that a recording medium such that the image density of the viewing surface may become higher than that of the printing surface can be obtained by selecting the arrangement such that an ink-retaining layer is joined together between a porous layer and a transparent substrate, and further the porous layer does not absorb inks by itself as far as possible and has through-holes (Japanese Patent Laid-open Publications No. 140878/1987, No. 140879/1987, No. 142680/1987, and EP No. 227 254 A2).

However, also in the recording medium according to this prior invention, there has come the disadvantage that, particularly in the image recording where inks are applied in a larger quantity as in color image recording, the difference in types of resins contained in the porous layer side in the form of particles may cause decrease of ability for absorbing the inks applied, or feathering of the images obtained.

These disadvantages have become serious problems to be settled, with recent progress in the high-speed, high-grade and full-color recording using ink-jet recording apparatus.

SUMMARY OF THE INVENTION

Accordingly, an object of the present invention is to provide a recording medium having a high gloss and image density as a matter of course, particularly having a greatly superior ink absorbing ability, and capable of giving recorded images having high image quality, perfectly free from feathering and of high recording density.

The above object can be achieved by the invention described below.

According to an aspect of the present invention, there is provided a recording medium comprising an ink-transporting layer and an ink-retaining layer, said ink-transporting layer being chiefly comprised of particles and a binder, wherein d24 0.1 μm when an average value of primary particle diameter of said particles is assumed as d, and the volume of the particles whose particle diameter (x) is included in the range of $d/2 \leqq x \leqq 2d$ is in a proportion of 90% or more of the whole particles.

BRIEF DESCRIPTION OF THE DRAWINGS

The FIGURE is a sectional view of a recording sheet comprising a support layer having thereon an ink-retaining layer and an ink-transporting layer.

According to another aspect of the present invention, there is provided an ink-jet recording process, comprising forming a recorded image having a density of 200×200 DPI (dots per inch) or more by using a recording medium comprising an ink-transporting layer and an ink-retaining layer, said ink-transporting layer being chiefly comprised of particles and a binder, wherein $d \geqq 0.1$ μm when an average value of primary particle diameter of said particles, is assumed as d, and the volume of the particles whose particle diameter (x) is included in the range of $d/2 \leqq x \leqq 2d$ is in a proportion of 90% or more of the whole particles.

According to a further aspect of the present invention, there is provided an ink-jet recording process, comprising forming a color image by using a recording medium comprising an ink-transporting layer and an ink-retaining layer, said ink-transporting layer being chiefly comprised of particles and a binder, wherein $d \geqq 0.1\ \mu m$ when an average value of primary particle diameter of said particles is assumed as d, and the volume of the particles whose particle diameter (x) is included in the range of $d/2 \leqq x \leqq 2d$ is in a proportion of 90% or more of the whole particles.

DETAILED DESCRIPTION OF THE PREFERRED EMBODIMENTS

The present inventors found that, in the recording medium comprising a substrate provided thereon with an ink-retaining layer and a porous ink-transporting layer, the disadvantages such as the decrease of ink-absorbing ability and the feathering caused particularly in the color image recording using said recording medium are caused not by the manner of selecting the resins contained in the porous ink-transporting layer in the form of particles but by the difference in the particle diameter and particle size distribution of that resin powder, and employment of a resin powder having the particle diameter and particle size distribution in a certain specific range can settle the above problems.

More specifically, in the recording mediums of the type that an ink-transporting layer and an ink-retaining layer are provided, inks are applied from the ink-transporting layer side, and formed images are viewed from the ink-retaining layer side, the greater part of the inks, when applied to the above ink-transporting layer, passes the ink-transporting layer, reaches to the ink-retaining layer, and is absorbed and fixed there. Accordingly, if the resin powder contained in the ink-transporting layer has an extremely irregular particle size, the void volume in the ink-transporting layer becomes small to lower the ink-transporting performance and also increase the branches of ink-flow paths in the ink-transporting layer, so that the images formed by inks having reached the ink-retaining layer may greatly suffer the feathering.

The above problem remarkably arises at color-recorded areas where inks are applied particularly in large quantity, and moreover the resolution will become unsatisfactory in the recording with a high density of as much as 200×200 DPI (dots per inch) or more, preferably 200×200 DPI to 600×600 DPI. Now, the recording medium of the present invention, which is a recording medium comprising a substrate provided thereon with an ink-retaining layer and a porous ink-transporting layer, is characterized by being so constituted that is $0.1\ \mu m$ or more when an average primary particle diameter of the resin powder contained in the above porous ink-transporting layer is assumed as d, and the volume of the particles whose particle diameter (x) is with the range of $d/2 \leqq x \leqq 2d$ is held in the proportion of 90% or more of the whole particles. Thus, it is a recording medium that can obtain recorded images of high image quality, having a high recording density, and have simultaneously settled the problems set out above.

The present invention will be described below in detail based on working examples and reference to the FIGURE.

As depicted in the Figure, the recording medium of the present invention is constituted of a substrate as a support, layer 1, an ink retaining layer 2 formed on said support to substantially absorb and capture a recording liquid or a recording agent, and an ink transporting layer 3 formed on the ink retaining layer and having liquid-permeability to directly accept the recording liquid, but not substantially allow it to remain.

The substrate may not be required if the ink transporting layer 2 or the ink retaining layer 3 may function simultaneously as a substrate.

The substrate used in the present invention may include those conventionally known, for example, plastic films or plates made of polyethylene terephthalate polycarbonate resins, polystyrene resins, polysulfone resins, polybutylene terephthalate resins, polyethylene resins, polypropylene resins, methacrylic resins, diallyl phthalate resins, unsaturated polyester resins, cellophane, acetate plastics, cellulose diacetate, cellulose triacetate, celluloid, polyvinyl chloride resins, polyvinylidene chloride resins, polyimide resins, or glass plates.

The substrate may have a thickness ranging between 1 and 5000 $\mu m$, preferably between 3 and 1000 $\mu m$, more preferably between 5 and 500 $\mu m$.

In the recording medium of the present invention, when observed from the side A opposite to the recording face B as shown in the Figure, the substrate is required to be transparent.

On such an occasion, the substrate may be applied with any processing if it can finally retain the transparency. For instance, it is possible to apply on it desired patterns or gloss (appropriate glass or silky pattern).

It is also possible to impart water resistance, abrasion resistance and blocking resistance to the image viewing face A as shown in the Figure the recording medium by selecting materials having water resistance, abrasion resistance and blocking resistance as the substrate.

The ink transporting layer 3 constituting the recording medium of the present invention is required to have liquid-permeability and a light diffusing property. The liquid-permeability mentioned in the present invention refers to the property that may immediately permeate a recording liquid and may not substantially allow a recording agent in the recording liquid to remain in the ink transporting layer.

In the present invention, as a preferred embodiment for improving the liquid-permeability, the surface or the inside of the ink transporting layer 3 may have porous structure containing fissures or communicated holes (including those of micro size).

As previously mentioned, in instances where the images obtained by the recording medium of the present invention are viewed from the side A opposite to the ink-applying surface B as shown in the Figure, the ink-transporting layer 3 may preferably have the light-diffusing property.

The ink-transporting layer 3 for satisfying the above property is comprised of particles and a binder that are free from being dyed by dyes, and the primary particle diameter (d) of the particles is $0.1\ \mu m$ or more, preferably ranges from $0.5\ \mu m$ to $20\ \mu m$. The particle size distribution is also important to these particles, and the volume of the particles whose particle diameter (x) is included in the range of $d/2 \leqq x \leqq 2d$ is required to account for the proportion of 90% or more of the whole particles. Herein, the primary particle diameter in the present application refers to the diameter of every minute particle constituting a large particle in the case that minute particles aggregate to form larger particles as in, for example, particles of silica, or refers to the diameter of the particles as, in the case when there is no such aggregation. The diameter of particles, herein mentioned, also refers to a diameter calculated as the diameter of a sphere having the same volume, and, assuming the volume of particles as V, it is represented by:

$$d = \sqrt[3]{\frac{6}{\pi} V}$$

The average primary particle diameter also means a volume average diameter ($D_3$), and represented by:

$$D_3 = \sqrt[3]{\frac{\underset{n}{\Sigma}(D^3)}{\underset{n}{\Sigma}}}, \; D^3 = V$$

In actual meaning, it is equal to a value obtained by dividing the volume (not apparent but actual) of the whole particles by the number of the particles to find an average volume of the particles, and calculating it into the diameter as the one corresponding to a sphere. It also may be a value obtained by dividing the weight of the whole particles by the number of the particles (i.e., average weight of particles), calculating the gravity into the volume, and further calculating it into the diameter.

If the average primary particle size and the particle size distribution come to be outside the above range, the ink-transporting layer 3 formed may have an insufficient ink-transporting performance and also have excessive branches of the ink-flow paths, causing feathering to occur, undesirably.

Such particles may be any particles so long as they are particles that may not substantially be dyed by the dyes or the like contained in inks, and the primary particle diameter and particle size distribution may be controlled by conventional methods.

As the non-dyable particles satisfying the above properties, there may be used at least one of organic resin particles made of thermoplastic resins or thermosetting resins including, for example, organic resin powder, an emulsion and a suspension of polyethylene resins, methacrylic resins, elastomers, polystyrene resins, ethylene-vinyl acetate copolymer, styrene-acrylic copolymer, fluoroplastics, polyamide resins, polyimide resins, polypropylene resins, methacrylic resins, guanamine resins, melamine formaldehyde resins, urea formaldehyde resins, silicones, celluloses, benzoguanamine resins, SBR (styrene-butadiene rubber), NBR, MBS, polytetrafluoro ethylene, polyesters, polyacrylamide thermoplastic elastmers, chloroprene, etc.

For the purpose of increasing the whiteness of the ink-transporting layer 3, there may be also added white inorganic pigments to the extent that the ink-permeability of the ink-transporting layer 3 may not be hindered, as exemplified by talc, calcium carbonate, calcium sulfate, magnesium hydroxide, basic magnesium carbonate, alumina, synthetic silica, calcium silicate, diatomaceous earth, aluminum hydroxide, clay, barium sulfate, titanium oxide, zinc oxide, zinc sulfide, satin white, silicon oxide, lithopone, etc.

The binder used in the present invention has a function to bind the above particles to each other and/or the ink retaining layer 3, and is required to be non-dyeable to the recording agent as in the case of the above particles.

As preferable materials for the binder, there may be used any of known materials of those having the above function, for example, one or more resins of poly-α-olefine resins, ionomer resins, acrylonitrilestyrene copolymer, ethylene-vinyl acetate copolymer, vinylidene chloride resins, polyvinyl acetate resins, styrene-acrylic copolymer, polyacrylamide resins, phenolic resins, isobutylene-moleic anhydride copolymer, epoxy resins, polyvinylidene chloride resins, xylene-formaldehyde resins, cumarone resins, ketone resins, polyvinyl alcohol, polyvinyl butyral resins, polyvinyl pyrrolidone, acrylic resins, starch, carbosymethol cellulose, methyl cellulose, ethyl cellulose, styrene butadiene rubber, gelatin, casein, polyurethane resins, polychloroprene resins, melamine formaldehyde resins, nitrile rubber, urea formaldehyde resins, gum arabic, etc.

To the ink transporting layer 2, it is also allowable to add particles having a higher refractive index, for example, pigment particles, in such an amount that may not impair its ink permeability.

If necessary, various additives, for example, a surfactant, a penetrating agent, etc. may be added to the ink transporting layer 2 in order to improve the above functions as an ink transporting layer 2.

The mixing ratio (by weight) of the non-dyeable particles and the binder in the ink transporting layer 2 (particles/binder) may range, preferably between 1/5 and 50/1, more preferably between 1/3 to 20/1. The mixing ratio of less than 1/3 may result in too small fissures and communicated holes in the ink transporting layer and decrease the absorbing ability of the recording liquid. The mixing ratio of more than 50/1, on the other hand, may result in insufficient adhesion between the particles themselves or the ink retaining layer 2 and the particles, whereby the ink transporting layer 3 cannot be formed.

The ink transporting layer 3 may have a thickness, though depending on the amount of the recording liquid, of 1 to 300 μm, preferably 1 to 200 μm, more preferably 3 to 80 μm.

Referring to the non-porous ink retaining layer 2 which substantially captures the recording liquid or the recording agent, it absorbs and captures the recording agent passed through the ink transporting layer to retain it substantially permanently. Therefore, it is required for the ink retaining layer 2 to have higher absorption power than the ink transporting layer 3.

This is because, if the absorption power of the ink retaining layer 2 is less than that of the ink transporting layer 3, it follows that the recording liquid applied on the surface of the ink transporting layer 3 remains retained in the ink transporting layer 3 when a top portion of the recording liquid reaches the ink retaining layer 2 after passing through the ink transporting layer 2, whereupon the recording liquid permeates and diffuses at the interface between the ink transporting layer 3 and the ink retaining layer 2 in the lateral direction in the ink transporting layer 3. As a result, the definition of recorded images will be lowered to make it impossible to form images of high quality.

The ink retaining layer 2, as mentioned before, is required to be transparent when recorded images are viewed from the side opposite to the recording face.

The ink retaining layer 2 satisfying the above requirements is preferably constituted of a light-transmissive resin capable of absorbing the recording agent and/or a light-transmissive resin having solubility and swelling property to the recording liquid.

For example, for an aqueous recording liquid containing, as the recording agent, an acidic dye or a direct dye, the ink retaining layer 2 is preferably constituted of a resin having the ability of absorbing a dye and/or a hydrophilic polymer having swelling property to the aqueous recording liquid.

The materials constituting the ink retaining layer 2 may not be particularly limited if they have a function to absorb and capture the recording liquid and are capable of forming a non-porous layer.

The ink retaining layer 2 may have a thickness sufficient for absorbing and capturing the recording liquid, which may range, though variable depending on the amount of the recording liquid, between 1 and 70 μm, preferably between 1 to 50 μm, and more preferably between 3 and 20 μm.

The materials constituting the ink-retaining layer 2 may be any materials as long as they can absorb water-based inks and retain the dyes contained in inks, but may preferably be prepared from water-soluble or hydrophilic polymers considering that inks are mainly water-based inks. Such water-soluble or hydrophilic polymers may include, for example, natural resins such as albumin, gelatin, casein, starch, cationic starch, gum arabic and sodium alginate; synthetic resins such as carboxymethyl cellulose, hydroxyethyl cellulose, polyamide, polyacrylamide, polyethyleneimine, polyvinyl pyrrolidone, quaternized polyvinyl pyrrolidone, polyvinyl pyridylium halide, melamine, phenol, alkyd, polyurethane, polyvinyl alcohol, ionically modified polyvinyl alcohol, polyester and sodium polyacrylate; preferably, hydrophilic polymers made water-insoluble by cross-linking of any of these polymers, hydrophilic and water-insoluble polymer complexes comprising two or more polymers, and hydrophilic and water-insoluble polymers having hydrophilic segments, etc. For the purpose of improving the above functions as the ink-retaining layer 2 various additives as exemplified by surface active agents, water-resisting agents, organic and inorganic pigments, etc. may optionally be further added to the ink-retaining layer.

The method of forming the ink retaining layer 2 and the ink transporting layer 3 on the substrate may preferably comprise preparing a coating liquid by dissolving or dispersing the material in a suitable solvent mentioned above, applying the coating liquid on the substrate by a conventionally known method such as roll coating, rod bar coating, spray coating and air knife coating, followed immediately by drying. Alternatively there may be used the hot melt coating mentioned before or a method comprising once making a single sheet from the above-mentioned materials, and then laminating the sheet on the substrate.

When the ink retaining layer 2 is provided on the substrate, however, strong adhesion is required between the substrate and the ink retaining layer 2 so that neither space nor gap may be present therebetween.

Presence of the gap between the substrate and ink-retaining layer 2 may cause irregular reflection on the recorded-image-viewing surface to substantially lower the image optical density, undesirably.

The recording medium of the present invention comprises the ink-transporting layer 3 being porous and having no ink-absorbing ability, and the ink-retaining layer, and once inks are applied to the above ink-transporting layer 3, the greater part of the inks passes the ink-transporting layer 3, reaches the ink-retaining layer 2, and is absorbed and fixed in the ink-retaining layer 2. Accordingly, beautiful images rich in high grade, having superior gloss and high optical density, can be viewed, as shown in the Figure from the ink-retaining layer 2 side (or substrate side). Moreover, since the images are retained, not on the surface of the recording medium, but inside the same, they are excellent also in storage stability such as water resistance, weathering resistance and abrasion resistance as a matter of course. Also, the classification sufficiently carried out beforehand on the resin powder contained in the ink-transporting layer to control its particle diameter and particle size distribution to a specific range can achieve greatly superior ink-absorption ability even in the color recording with high speed and in a high density of 200×200 DPI (dots per inch), so that the images formed can be perfectly free from feathering and excellent in resolution.

EXAMPLES

The present invention will be specifically described on the bases of Examples and Comparative Examples. In the following description, "%" or "part(s)" are by weight unless particularly mentioned, and the average primary particle diameter is meant to be the volume average diameter.

EXAMPLE 1

Using polyester film (100 μm thick; available from Toray Industries, Inc.) as a light-transmissive substrate, Composition A shown below was coated on this substrate by means of a bar coater to have a dried thickness of 8 μm, followed by drying for 10 minutes at 140° C.

Composition A

Polyvinyl pyrrolidone (PVA K-90; available from GAF; a 10% DMF solution): 88 parts
Novolac type phenol resin (RESITOP PSK-2320; available from Gun-ei Chemical Industry Co., Ltd.; a 10% DMF solution): 12 parts Composition B shown below was further coated thereon to have a dried thickness of 40 μm, followed by drying for 3 minutes at 140° C. to obtain a recording medium of the present invention.

Composition B

Polymethyl methacrylate powder*: 100 parts
* Having been classified to give a volume fraction of 90% or more, of the particles having an average primary particle diameter (d)=5.4 μm and a particle diameter of 3 μm to 10 μm.
Acrylic styrene emulsion (BONCOAT 4001; available from Dainippon Ink & Chemicals, Incorporated): 20 parts
Polyoxyethylene octylphenyl ether (EMULGEN 810; available from Kao Corporation: 0.5 part
Water: 80 parts Here, the particles were classified by employing a filtration method, a centrifugal separation method, a sedimentation method, etc., and the diameter of the separated particles was evaluated by use of an electron microscope.

Using 4 kinds of inks shown in Table 1 below, the recording was performed with an ink droplet diameter of 35 μm and 400×400 DPI on the recording medium thus obtained, by use of a recording apparatus comprising an on-demand type ink-jet recording head that ejects inks by the aid of the pressure of bubbles generated with a heat resistance element.

TABLE 1

| | |
|---|---|
| Yellow ink (make-up): | |
| C.I.; Direct Yellow 86 | 2 parts |
| Diethylene glycol | 20 parts |
| Polyethylene glycol #200 | 10 parts |
| water | 70 parts |
| Red ink (make-up): | |
| C.I. Acid Red 35 | 2 parts |
| Diethylene glycol | 20 parts |
| Polyethylene glycol #200 | 10 parts |
| water | 70 parts |
| Blue ink (make-up): | |
| C.I. Direct Blue 86 | 2 parts |
| Diethylene glycol | 20 parts |
| Polyethylene glycol #200 | 10 parts |
| water | 70 parts |
| Black ink (make-up): | |
| C.I. Food Black 2 | 2 parts |
| Diethylene glycol | 20 parts |
| Polyethylene glycol #200 | 10 parts |
| Water | 70 parts |

With regard to the records thus obtained, the following evaluation was made.

(1) Ink-absorbing ability was evaluated by measuring the time by which, after ink-jet recording, the records were left to stand at room temperature until no ink adheres to fingers when records are touched with fingers.

(2) Image optical density was measured on the print surface and the image-viewing surface with respect to the black ink recorded area by using Macbeth Densitometer RD-918.

(3) Image surface gloss was evaluated by measuring 45° specular gloss of the image-viewing surface according to JIS Z8741.

(4) Feathering of images was organoleptically evaluated by visual observation of the feathering at areas where printing was made in two colors, three colors and four colors, respectively. The visual evaluation was made according to a three-rank system to regard the best as A, and the following as B and C, in order. The results are shown in Table 2.

EXAMPLE 2

Example 1 was repeated to obtain a recording medium of the present invention, except that Composition C shown below was coated in place of Composition B in Example 1 to have a dried thickness of 40 μm, followed by drying for 5 minutes at 140° C.

Composition C

Spherical silica particles* (HARIMIC S-O; available from Micron Co.): 40 parts

* Having been classified in the same manner as in Example 1 to give a volume fraction of 90% or more, of the particles having an average primary particle diameter (d)=4 μm and a particle diameter of 2 μm to 8 μm. Evaluation was made in the same manner as in Example 1 on the recording medium thus obtained.

Ionomer resin emulsion (CHEMIPEARL SA-100; available from Mitsui Petrochemical Industries, Ltd.) 15 parts Water: 60 parts Results as shown in Table 2 below.

EXAMPLE 3

Example 1 was repeated to obtain a recording medium of the present invention, except that Composition D shown below was coated in place of Composition B in Example 1 to have a dried thickness of 30 μm, followed by drying for 5 minutes at 140° C.

Composition D

Polystyrene beads* (FINE PEARL 3000 SP; available from Sumitomo Chemical Co., Ltd.): 40 parts

* Having been classified in the same manner as in Example 1 to give a volume fraction of 90% or more. of the particles having an average primary particle diameter (d)=6 μm and a particle diameter of 3 μm to 10 μm. Evaluation was made in the same manner as in Example 1 on the recording medium thus obtained.

Acrylic styrene emulsion (BONCOAT 4001; available from Dainippon Ink & Chemicals, Incorporated): 10 parts Sodium dioctyl sulfosuccinate (PELEX OT-P; available from Kao Corporation): 1 part Water: 60 parts Results are shown in Table 2 below.

EXAMPLE 4

Example 1 was repeated to obtain a recording medium of the present invention, except that Composition E shown below was coated in place of Composition B in Example 1 to have a dried thickness of 30 μm, followed by drying for 10 minutes at 100° C.

Composition E

Pulverized polyethylene particles* (FLOW-THENE UF; available from Seitetsu Kagaku Co., Ltd.): 20 parts

* Having been classified in the same manner as in Example 1 to give a volume fraction of 90% or more, of the particles having an average primary particle diameter (d)=15 μm and a particle diameter of 10 μm to 30 μm. Evaluation was made in the same manner as in Example 1 on the recording medium thus obtained.

Butyral resin (S-LEC Bx-5; available from Sekisui Chemical Co., Ltd.): 8 parts

Sodium dioctyl sulfosuccinate (PELEX OT-P; available from Kao Corporation): 1 part Ethyl cellosolve: 80 parts Results as shown in Table 2 below.

COMPARATIVE EXAMPLE 1

Example 1 was repeated to prepare a recording medium, except that used as the polymethyl methacrylate powder of Composition B was a powder having been not sufficiently classified, having a volume fraction of about 80%, of the particles of d=5.7 μm and having a particle diameter included in the range of 2.8 μm to 11 μm.

COMPARATIVE EXAMPLE 2

Example 2 was repeated to prepare a recording medium, except that used as the pulverized spherical silica particles of Composition C were those having been not sufficiently classified, having a volume fraction of about 75%, of the particles of d=3.3 μm and having a particle diameter included in the range of 1.5 μm to 8 μm.

COMPARATIVE EXAMPLE 3

Example 3 was repeated to prepare a recording medium, except that used as the polyethylene beads of Composition D were those having been not sufficiently classified, having a volume fraction of about 80%, of the particles of d=6 μm and having a particle diameter included in the range of 3 μm to 12 μm.

COMPARATIVE EXAMPLE 4

Example 4 was repeated to prepare a recording medium, except that used as the pulverized polyethylene particles of Composition E were those having been not sufficiently classified, having a volume fraction of about 63%, of the particles of d = 15 μm and having a particle diameter included in the range of 7 μm to 30 μm.

Evaluation was made in the same manner as in Example 1 on the recording mediums thus obtained. Results as shown in Table 2 below.

TABLE 2

| | 1 | 2 | 3 | 4 |
|---|---|---|---|---|
| | Examples | | | |
| Ink-absorbing ability: | 1 sec | 1 sec | 1 sec | 1 sec |
| Image optical density: | | | | |
| (Print surface) | 0.50 | 0.52 | 0.60 | 0.58 |
| (Viewing surface) | 1.52 | 1.48 | 1.24 | 1.13 |
| Gloss (%): | 118 | 116 | 119 | 116 |
| Feathering: | | | | |
| (2 colors) | A | A | A | A |
| (3 colors) | A | A | A | A |
| (4 colors) | B | B | B | B |
| | Comparative Examples | | | |
| Ink-absorbing ability: | 2 sec | 1 sec | 1 sec | 1 sec |
| Image optical density: | | | | |
| (Print surface) | 0.60 | 0.54 | 0.60 | 0.56 |
| (Viewing surface) | 0.88 | 0.96 | 1.04 | 0.80 |
| Gloss (%): | 117 | 116 | 119 | 115 |
| Feathering: | | | | |
| (2 colors) | B | A | A | A |
| (3 colors) | C | B | A | B |
| (4 colors) | C | C | C | C |

EXAMPLE 5

Full color images were formed on the recording medium of example 1 described above, so as to give the following:

(1) 200×200 DPI (dots per inch); ink-droplet diameter: 65 μm (2) 300×300 DPI (dots per inch); ink-droplet diameter: 58 μm (3) 400×400 DPI (dots per inch); ink-droplet diameter: 30 μm

COMPARATIVE EXAMPLE 5

Full color images were formed on the recording medium of Comparative Example 1 described above, so as to give (1) to (3) of Example 5.

With regard to the thus obtained records of Example and Comparative Example, the resolution of the whole recorded images was visually observed to make evaluation according to a three-rank system to regard the best as A, and the following as B and $C_j$ in order. Results obtained are shown in Table 3 below.

TABLE 3

| | Example 5 | | | Compar. Example 5 | | |
|---|---|---|---|---|---|---|
| | (1) | (2) | (3) | (1) | (2) | (3) |
| Image resolution: | A | A | A | B | C | C |

What is claimed is:

1. A recording medium comprising an ink-transporting layer and a non-porous ink-retaining layer, said ink-transporting layer being chiefly comprised of particles and a binder, wherein d≧0.1 μm when an average value of primary particle diameter of said particles is assumed as d, and the volume of the particles whose particle diameter (x) is included in the range of d/2≦x≦2d is in a proportion of 90% or more of the whole particles.

2. The recorrding medium of claim 1, wherein said ink-transporting layer and said ink-retaining layer are laminated on a light-transmissive substrate.

3. The recording medium of claim 1, wherein the average value of primary particle diameter (d) of said particles is in the range of 0.5 μm≦d≦20 μm.

4. The recording medium of claim 1, wherein said particles are those having been classified before coating.

5. An ink-jet recording process, comprising forming a recorded image having a density of 200×200 DPI (dots per inch) or more by using a recording medium comprising a non-porous ink-transporting layer and an ink-retaining layer, said ink-transporting layer being chiefly comprised of particles and a binder, wherein d≧0.1 μm when an average value of primary particle diameter of said particles is assumed as d, and the volume of the particles whose particle diameter (x) is inlcuded in the range of d/2≦x≦2d is in a proportion of 90% or more of the whole particles.

6. The ink-jet recording process of claim 5, wherein the ink-transporting layer and ink-retaining layer of said recording medium are laminated on a light-transmissive substrate.

7. The ink-jet recording process of claim 5, wherein the average value of primary particle diameter (d) of the particles in said recording medium is in the range of 0.5 μm≦d≦20 μm.

8. The ink-jet recording process of claim 5, wherein the particles in said recording medium are those having been classified before coating.

9. The ink-jet recording process of claim 5, wherein formed is a recorded image having a density of 300×300 DPI (dots per inch) or more.

10. The ink-jet recording process of claim 5, wherein formed is a recorded image having a density of 400×400 DPI (dots per inch) or more.

11. An ink-jet recording process, comprising forming a color image by using a recording medium comprising a non-porous ink-transporting layer and an ink-retaining layer, said ink-transporting layer being chiefly comprised of particles and a binder, wherein d≧0.1 μm when an average value of primary particle diameter of said particles is assumed as d, and the volume of the particles whose particle diameter (x) is included in the range of d/2≦x≦2d is in a proportion of 90% or more of the whole particles.

12. The ink-jet recording process of claim 11, wherein the ink-transporting layer and ink-retaining layer of said recording medium are laminated on a light-transmissive substrate.

13. The ink-jet recording process of claim 11, wherein the average value of primary particle diameter (d) of the particles in said recording medium is in the range of 0.5 μm≦d≦20 μm.

14. The ink-jet recording process of claim 11, wherein the particles in said recording medium are those having benn classified before coating.

15. The ink-jet recording process of claim 11, wherein formed is a color image having a density of 200×200 DPI (dots per inch) or more.

16. The ink-jet recording process of claim 11, wherein formed is a color image having a density of 300×300 DPI (dots per inch) or more.

17. The ink-jet recording process of claim 11, wherein formed is a color image having a density of 400×400 DPI (dots per inch) or more.

18. The recording medium of claim 1, wherein the ink-transporting layer is porous.

19. The recording medium of claim 1, wherein the ink-transporting layer is light-diffusible.

20. The recording medium of claim 1, wherein the ink-retaining layer is light-transmissive.

21. The ink-jet recording process of claim 5, wherein the ink-transporting layer is porous.

22. The ink-jet recording process of claim 5, wherein the ink-transporting layer is light-diffusible.

23. The ink-jet recording process of claim 5, wherein the ink-retaining layer is light-transmissive.

24. The ink-jet recording process of claim 11, wherein the ink-transporting layer is porous.

25. The ink-jet recording process of claim 11, wherein the ink-transporting layer is light-diffusible.

26. The ink-jet recording process of claim 11, wherein the ink-retaining layer is light-transmissive.

27. A record comprising an image of color matter formed in a recording medium comprising an ink-transporting layer and a non-porous ink-retaining layer, said ink-transporting layer being chiefly comprised of particles and a binder, wherein $d \geqq 0.1$ μm when an average value of primary particle diameter of said particles is assumed as d, and the volume of the particles whose particle diameter (x) is included in the range of $d/2 \leqq x \leqq 2d$ is in a proportion of 90% or more of the whole particles.

28. The record of claim 27, wherein the ink-transporting layer and the ink-retaining layer are laminated on a light-transmissive substrate.

29. The record of claim 27, wherein the average value of primary particle diameter (d) of the particles is in the range of 0.5 $\mu m \leqq d \leqq 20$ μm.

30. The record of claim 27, wherein the ink-transporting layer is porous.

31. The record of claim 27, wherein the ink-transporting layer is light-diffusible.

32. The record of claim 27, wherein the ink-retaining layer is light-transmissive.

33. The record of claim 27, wherein the image of coloring matter is formed in the ink-retaining layer.

34. The record of claim 27, wherein the image of coloring matter has a density of at least 200×200 DPI (dots per inch).

35. The record of claim 27, wherein the image of coloring matter has a density of at least 300×300 DPI (dots per inch).

36. The record of claim 27, wherein the image of coloring matter has a density of at least 400×400 DPI (dots per inch).

37. The record of claim 27, wherein the image of coloring matter is a full color image.

* * * * *

UNITED STATES PATENT AND TRADEMARK OFFICE
CERTIFICATE OF CORRECTION

PATENT NO. : 5,027,131
Page 1 of 4
DATED : June 25, 1991
INVENTOR(S) : Kenji Hasegawa et al.

It is certified that error appears in the above-identified patent and that said Letters Patent is hereby corrected as shown below:

COLUMN 1:

Line 21, "the" should be deleted.

Line 31, "and," should read --, and--.

Line 50, "that" should read --as--.

Line 57, "and" should be deleted.

Line 58, "No." should read --and No.--.

COLUMN 2:

Line 47, "d24 0.1μm" should read --d≥0.1μm--.

Delete lines 52-56.

COLUMN 3:

After line 11, insert:

--BRIEF DESCRIPTION OF THE DRAWINGS

The Figure is a sectional view of a recording sheet comprising a support layer having thereon an ink-retaining layer and an ink-transporting layer.--.

UNITED STATES PATENT AND TRADEMARK OFFICE

CERTIFICATE OF CORRECTION

PATENT NO. : 5,027,131 Page 2 of 4

DATED : June 25, 1991

INVENTOR(S) : Kenji Hasegawa et al.

It is certified that error appears in the above-identified patent and that said Letters Patent is hereby corrected as shown below:

COLUMN 3

Line 34, "to" should be deleted.

Line 53, "is" should read --it is--.

Line 68, "support," should read --support--.

COLUMN 4:

Line 32, "as shown in the Figure the recording medium" should read --of the recording medium as shown in the Figure--.

COLUMN 5:

Line 15, "$D_3$" should read --$\bar{D}_3$--.

Line 66, "layer 3" should read --layer 2--.

COLUMN 6:

Line 17, "layer 2" should read --layer 3--.

Line 23, "layer 2" should read --layer 3--.

UNITED STATES PATENT AND TRADEMARK OFFICE
CERTIFICATE OF CORRECTION

PATENT NO. : 5,027,131 Page 3 of 4

DATED : June 25, 1991

INVENTOR(S) : Kenji Hasegawa et al.

It is certified that error appears in the above-identified patent and that said Letters Patent is hereby corrected as shown below:

COLUMN 6

Line 24, "layer 2." should read --layer 3.--

Line 26, "layer 2" should read --layer 3--.

Line 54, "layer 2," should read --layer 3,--.

COLUMN 8:

Line 54, "Corporation:" should read --Corporation):--.

COLUMN 9:

Table 1, "C.I.; Direct Yellow 86" should read --C.I. Direct Yellow 86--.

Line 58, "Ltd.)" should read --Ltd.):--.

COLUMN 11:

Line 29, "example 1" should read --Example 1--.

Line 47, "C;" should read --C,--.

Line 66, "recorrding" should read --recording--.

UNITED STATES PATENT AND TRADEMARK OFFICE
CERTIFICATE OF CORRECTION

PATENT NO. : 5,027,131 Page 4 of 4

DATED : June 25, 1991

INVENTOR(S) : Kenji Hasegawa et al.

It is certified that error appears in the above-identified patent and that said Letters Patent is hereby corrected as shown below:

COLUMN 12:

Line 9, "a non-porous ink-transporting" should read --an ink-transporting--; and "an ink-" should read --a non-porous ink--.

Line 36, "a non-porous ink-transporting" should read --an ink-transporting--; and "an ink-retaining" should read --a non-porous ink-retaining--.

Signed and Sealed this

Twenty-fourth Day of November, 1992

*Attest:*

DOUGLAS B. COMER

*Attesting Officer* *Acting Commissioner of Patents and Trademarks*